Nov. 20, 1928.

J. DE LA CIERVA 1,692,081

AIRCRAFT WITH ROTATIVE WINGS

Filed Nov. 10, 1926.

2° 2° 2° 2°15' 2°30' 2°45' 3°

7
7

Inventor
J. de la Cierva
by [signature]
Attys.

Patented Nov. 20, 1928.

1,692,081

UNITED STATES PATENT OFFICE.

JUAN DE LA CIERVA, OF MADRID, SPAIN.

AIRCRAFT WITH ROTATIVE WINGS.

Application filed November 10, 1926, Serial No. 147,569, and in Great Britain November 24, 1925.

This invention relates to aircraft of the type embodying a wing system which rotates freely in flight by reason of the action of the air flow on the wings and in which the wings are hinge-jointed to the axis of rotation in such a manner that each wing is free to adopt at all times positions in which the centrifugal force due to rotation and the lift are in equilibrium. The present invention is more particularly directed to improved or modified wing constructions with aerodynamical characteristics which render them particularly suitable for this type of wing system.

In this type of wing system it is found that, over a part of the revolution, the portion of the wing lying nearest the root assumes a "stalling" attitude, that is, its angle to the relative air flow is greater than that giving maximum lift, and at such time these inner sections of the wings are giving little lift and considerable drag. An object of the invention is to minimize this effect.

The invention is further directed to the reduction of "profile drag" losses, which are those due to the skin friction of the wing with the air, and since those parts of the wing near the tip contribute largely to these "profile drag" losses, the invention contemplates narrowing the wing chord towards the tip.

It may be said therefore that a general object of the invention is to design a plan form of wing with an improved mean $\frac{\text{lift}}{\text{drag}}$ ratio. With this object in view the invention primarily consists in a wing formation in which the chord is relatively small in the part nearest the root, increases to a maximum in the outer half of the wing's length, and thence again decreases towards the tip.

I am aware that propeller blades have been proposed which possess these characteristics of plan form but it should be appreciated that the considerations which dictate the plan form of power-driven propellers differ from those for freely rotating wings. With a lifting propeller revolving in a horizontal plane the direction of the air flow through the disc area swept by the blades is downwards, whereas in the freely rotating hinged-wing system the air flow is from below upwards, due to the fact that the mean plane of rotation is backwardly inclined to the relative air flow by reason of the hinge joints which permits the wings advancing against the air flow to rise, reaching their highest position when pointing more or less forward in the direction of flight. It will be apparent therefore that in the propeller the sections of the blade near the root are acting over a large part of the revolution at negative incidence and nowhere reach the "stalling" angle as do the inner sections of freely rotating hinged wings, when pointing forward in the direction of flight.

A further object of the invention is to improve the efficiency of the wing by giving it a varying angle of incidence or pitch which is greatest near the wing tip and diminishes towards the root. This is the converse of the case of a propeller in which the pitch angle is usually greatest near the root and diminishes towards the tip.

Still further, according to the present invention where the wing structure itself is sufficiently heavy to maintain the requisite value for centrifugal force during rotation, the preferred type of wing is one which, viewed in longitudinal edge profile, is straight. Where on the other hand it is found necessary to load the wing tip in order to maintain this centrifugal component, the longitudinal edge profile is advantageously warped, the convexity being uppermost, and preferably, instead of presenting a continuous curve from root to tip, is formed in two or more substantially straight portions connected by parts of arcuate profile.

In order that the invention may be fully understood, and readily carried into practice by those skilled in the art reference will now be made to the accompanying drawings in which examples of preferred wing constructions are shown.

Figs. 1, 2 and 3 are plan views of varying chord wings in accordance with the invention. A is the root of the wing, i. e. the part which is connected by means of a hinge joint to the common centre of rotation for the wing system, and B is the wing tip. In each case it will be seen that a part only of the wing is an effective lifting aerofoil, the inner portions nearest A being narrowed practically to the dimensions of a supporting spar. The maximum chord is in each case located between one-half and three-quarters of the total wing length measured from the root.

In Fig. 4 is illustrated an example of varying incidence in accordance with the present invention, the figures indicating positive angles of incidence at their respective wing sections. Although the type of wing shewn in Fig. 4 is one in which the lifting surface is of substantially constant chord, such a series of angles of incidence would apply equally to the other forms of wing illustrated.

Figs. 5 and 6 are plan views of wings of good aspect ratio, and which represent a most general and widely useful form of wing in accordance with the invention, being suitable, with possibly minor modifications for substantially all types of aircraft embodying wing systems of the character referred to. The maximum chord is located between one-half and two-thirds of the length measured from the root and is maintained constant for a substantial part of the effective surface.

The form shown in Fig. 6 is similar in aerodynamical characteristics to that of Fig. 5, except that its aspect ratio is somewhat greater, the maximum chord being less, and decreasing more sharply to the wing tip than in Fig. 5.

What I claim is:—

Figure 1:
Figure 2:
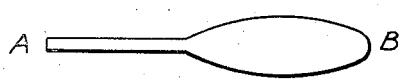
Figure 3:
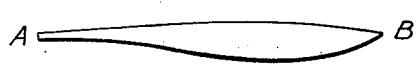
Figure 4:
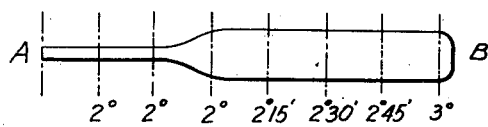
Figure 5:
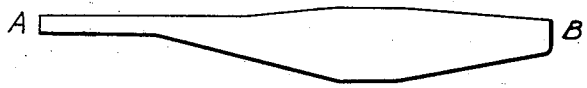
Figure 6:
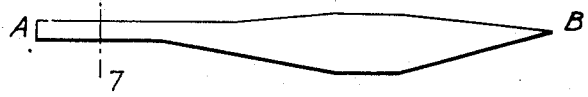
Figure 7:
Fig. 7 is a section (to an enlarged scale) on the line 7—7 Fig. 6, and may be taken as a typical section in the neighbourhood of the wing root of all the forms of wing illustrated. The diameter $y$ should be as small as possible consistent with avoidance of vortices or eddy losses.
Figure 8:
Figs. 8 and 9 show typical longitudinal edge profiles in accordance with the invention in which in Fig. 8 two, and in Fig. 9 three, straight sections are joined by arcuate portions Z.
Figure 9:
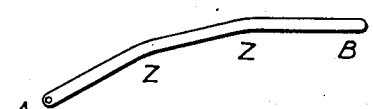
Figure 10:
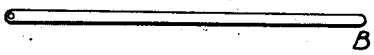
Fig. 10 shows a straight longitudinal edge profile which it is preferred to employ in all cases where the structural weight of the wing is sufficient relatively to the total weight of the aircraft to ensure that the wings shall maintain their most efficient position in flight.
Figure 11:
Fig. 11 is a warped edge profile made up of two straight portions joined by an arcuate portion Z and with the wing tip loaded in order to maintain the desired value for centrifugal force.

1. In aircraft in which the supporting surfaces are constituted by freely rotative wings driven by the relative air flow in flight and hinge-jointed to the axis of rotation, a wing formation in which the chord is relatively small in the part nearest the root, increases to a maximum in the outer half of the wing's length, and thence again decreases towards the tip.

2. In aircraft in which the supporting surfaces are constituted by freely rotative wings driven by the relative air flow in flight and hinge-jointed to the axis of rotation, a wing formation in which the chord is relatively small in the part nearest the root, said part being symmetrically bi-convex in section, the chord increasing to a maximum in the outer half of the wing's length, and thence again decreases towards the tip.

3. In aircraft in which the supporting surfaces are constituted by freely rotative wings driven by the relative air flow in flight and hinge-jointed to the axis of rotation, a wing formation in which the chord is relatively small in the part nearest the root, increases to a maximum in the outer half of the wing's length, and thence again decreases towards the tip, the angle of incidence or pitch being greatest in the region of the wing tip and diminishing towards the root.

4. In aircraft in which the supporting surfaces are constituted by freely rotative wings driven by the relative air flow in flight and hinge-jointed to the axis of rotation, a wing formation in which the chord is relatively small in the part nearest the root, increases to a maximum in the outer half of the wing's length, and thence again decreases towards the tip, the wing being warped, viewed in longitudinal edge profile, with the convexity uppermost.

5. In aircraft in which the supporting surfaces are constituted by freely rotative wings driven by the relative air flow in flight and hinge-jointed to the axis of rotation, a wing formation in which the chord is relatively small in the part nearest the root, increases to a maximum in the outer half of the wing's length, and thence again decreases towards the tip, the angle of incidence or pitch being greatest in the region of the wing tip and diminishing towards the root, and the wing being warped, viewed in longitudinal edge profile, with the convexity uppermost.

6. In aircraft in which the supporting surfaces are constituted by freely rotative wings driven by the relative air flow in flight and hinge-jointed to the axis of rotation, a wing formation in which the chord is relatively small in the part nearest the root, increases to a maximum in the outer half of the wing's length, and thence again decreases towards the tip, the wing being formed in two or more straight portions joined by arcuate portions so that the wing is warped, viewed in longitudinal edge profile, with the convexity uppermost.

7. In aircraft in which the supporting surfaces are constituted by freely rotative wings driven by the relative air flow in flight and hinge-jointed to the axis of rotation, a wing formation in which the chord is relatively small in the part nearest the root, increases to a maximum in the outer half of the wing's length, and thence again decreases towards the tip, the angle of incidence or pitch being greatest in the region of the wing tip and diminishing towards the root, and the wing being formed in two or more straight portions joined by arcuate portions so that the wing is warped, viewed in longitudinal edge profile, with the convexity uppermost.

JUAN DE LA CIERVA.